United States Patent
Seepersad et al.

(10) Patent No.: US 10,030,733 B2
(45) Date of Patent: Jul. 24, 2018

(54) NEGATIVE STIFFNESS HONEYCOMB MATERIAL

(71) Applicant: Board of Regents, The University of Texas System, Austin, TX (US)

(72) Inventors: Carolyn Conner Seepersad, Austin, TX (US); Michael Haberman, Austin, TX (US); Timothy Klatt, Austin, TX (US); Dixon Correa, Austin, TX (US)

(73) Assignee: Board of Regents, The University of Texas System, Austin, TX (US)

( * ) Notice: Subject to any disclaimer, the term of this patent is extended or adjusted under 35 U.S.C. 154(b) by 0 days.

(21) Appl. No.: 14/816,878

(22) Filed: Aug. 3, 2015

(65) Prior Publication Data

US 2016/0032997 A1 Feb. 4, 2016

Related U.S. Application Data

(60) Provisional application No. 62/032,152, filed on Aug. 1, 2014.

(51) Int. Cl.
*F16F 1/36* (2006.01)
*F16F 1/373* (2006.01)

(52) U.S. Cl.
CPC .... *F16F 1/3737* (2013.01); *F16F 2224/0225* (2013.01); *F16F 2228/063* (2013.01)

(58) Field of Classification Search
CPC ...... F16F 1/36; F16F 1/3737; F16F 224/0225; F16F 228/063
USPC ...................... 267/141.7, 158, 160, 164, 182
See application file for complete search history.

(56) References Cited

U.S. PATENT DOCUMENTS

| | | | | | |
|---|---|---|---|---|---|
| 5,165,125 | A | * | 11/1992 | Callaway | A47C 23/002 267/148 |
| 5,747,140 | A | * | 5/1998 | Heerklotz | A47C 27/144 248/630 |
| 5,785,303 | A | * | 7/1998 | Kutschi | A47C 23/00 267/103 |
| 2012/0073884 | A1 | * | 3/2012 | Guthrie | B60G 11/00 177/225 |
| 2012/0125699 | A1 | * | 5/2012 | Guthrie | B60G 11/00 177/225 |
| 2013/0214464 | A1 | * | 8/2013 | Lancho Doncel | F16F 7/00 267/140.11 |

(Continued)

OTHER PUBLICATIONS

Pontecorvo et al., Bistable arches for morphing application, Journal of Intelligent Material Systems and Structures, 2012, vol. 24(3), pp. 274-286.

(Continued)

*Primary Examiner* — Xuan Lan Nguyen
(74) *Attorney, Agent, or Firm* — Meunier Carlin & Curfman LLC (57) ABSTRACT

A honeycomb structure having high levels of recoverable energy absorption is provided. The honeycomb structure achieves high levels of recoverable energy absorption by incorporating cells that exhibit negative stiffness. In one embodiment, the cells exhibit negative stiffness via curved beam members configured to snap through to a second position upon experiencing a sufficient force. The cells may also be configured to snap back to their original position when the force is removed. Therefore, the honeycomb structure may be capable of repeatedly achieving a high level of recoverable energy absorption.

9 Claims, 8 Drawing Sheets

(56) References Cited

U.S. PATENT DOCUMENTS

2015/0167768 A1* 6/2015 Zhao .................. F16F 1/368
267/164

OTHER PUBLICATIONS

Balandin, D.V., et al., "Optimal Protection from Impact, Shock, and Vibration," *Shock and Vibration*, vol. 8, 2001, pp. 367-368.

Barry Controls Engineering Department, "Passive Shock Isolation," Reprinted from Sound and Vibration, www.barrycontrols.com/uploads/tech/PassiveShock.pdf. Accessed Apr. 22, 2012, 26 pages.

Fulcher, B.A., et al., "Analytical and Experimental Investigation of Buckled Beams as Negative Stiffness Elements for Passive Vibration and Shock Isolation Systems," ASME Journal of Vibration and Acoustics, Jun. 2014, vol. 136, 12 pages.

Gibson, L., 3.054/3.36 Cellular Solids: Structure, Properties and Applications, Lectures 1-6, (Massachusetts Institute of Technology: MIT OpenCourseWare), Cambridge University Press, Cambridge, UK http://ocw.mit.edu, Spring 2014, 176 pages.

Gibson, L., 3.054/3.36 Cellular Solids: Structure, Properties and Applications, Lectures 7-11, (Massachusetts Institute of Technology: MIT OpenCourseWare), Cambridge University Press, Cambridge, UK http://ocw.mit.edu, Spring 2014, 135 pages.

Gibson, L., 3.054/3.36 Cellular Solids: Structure, Properties and Applications, Lectures 12-15, (Massachusetts Institute of Technology: MIT OpenCourseWare), Cambridge University Press, Cambridge, UK http://ocw.mit.edu, Spring 2014, 169 pages.

Gibson, L., 3.054/3.36 Cellular Solids: Structure, Properties and Applications, Lectures 16-21, (Massachusetts Institute of Technology: MIT OpenCourseWare), Cambridge University Press, Cambridge, UK http://ocw.mit.edu, Spring 2014, 145 pages.

Hayes, A.M., et al., "Mechanics of Linear Cellular Alloys," Mechanics of Materials, vol. 36, No. 8, 2004, pp. 691-713.

Kashdan, "Evaluation of Negative Stiffness Elements for Enhanced Material Damping Capacity," M.S. Thesis, Mechanical Engineering Department, The University of Texas at Austin, Austin, TX, May 2010, 116 pages.

Kent, R.W., et al., "Optimal Control of Restraint Forces in an Automobile Impact," ASME Journal of Dynamic Systems, Measurement, and Control, vol. 129, Jul. 2007, pp. 415-424.

Qiu, J. et al., "A Curved-Beam Bistable Mechanism," IEEE Journal of Microelectromechanical Systems vol. 13, No. 2, Apr. 2004, pp. 137-146.

Seepersad, C.C., et al., "Robust Design of Cellular Materials with Topological and Dimensional Imperfections," ASME Journal of Mechanical Design, vol. 128, No. 6, Nov. 2006, pp. 1285-1297.

Zhou, N., et al., "A tunable high-static-low-dynamic stiffness vibration isolator," Journal of Sound and Vibration, vol. 329, 2010, pp. 1254-1273.

* cited by examiner

NEGATIVE STIFFNESS HONEYCOMB MATERIAL

PRIORITY INFORMATION

This application claims priority to U.S. Provisional Patent Application No. 62/032,152, filed on Aug. 1, 2014 and hereby incorporated by reference in its entirety.

BACKGROUND

Honeycomb materials are lightweight and well known for providing elevated stiffness, strength, and mechanical energy absorption properties. When subjected to in-plane compression, honeycomb structures typically undergo an initial region of elastic deformation, in which the cell walls bend, compress, and/or extend elastically. The stiffness depends on the cell structure. The region of elastic deformation typically ends when the mesostructure reaches a plateau stress, at which point the individual cell walls begin to collapse by buckling. At extremely low relative densities, elastic buckling can occur, but for most practical relative densities, collapse is associated with plastic buckling and yielding. With increasing loads, the mesostructure continues to absorb energy as cell walls progressively collapse. Eventually, when cell wall collapse is complete, the mesostructure densifies, and stiffness rapidly approaches that of the constituent material in the cell walls.

However, known honeycomb structures exhibit various shortcomings. For example, as a typical honeycomb structure is compressed, it elastically deforms until the cell walls begin to collapse. Once the cell walls collapsed, they cannot recover their original form. As a result, a typical honeycomb structure that experiences a force sufficient to collapse cell walls will never be able to recover its original form. While this type of honeycomb structure may still provide impact absorbance initially, it would not be able to provide the same level of impact absorbance afterwards. In other words, the energy absorption of a typical honeycomb structure is not recoverable.

A typical honeycomb structure therefore has a distinct disadvantage when used for energy absorption in an apparatus that is expected to experience more than one application of external force. Instead, the typical honeycomb structure must be repaired or replaced whenever it is subjected to a force sufficient to cause collapse. This can increase cost, lower efficiency, and increase the maintenance requirements for particular structures incorporating typical honeycomb designs. There is a distinct need for a honeycomb structure that provides high levels of recoverable energy absorption.

Other systems, methods, features and/or advantages will be or may become apparent to one with skill in the art upon examination of the following drawings and detailed description. It is intended that all such additional systems, methods, features and/or advantages be included within this description and be protected by the accompanying claims.

BRIEF DESCRIPTION OF THE DRAWINGS

The following detailed description will be better understood when read in conjunction with the appended drawings, in which there is shown one or more of the multiple embodiments of the present invention. It should be understood, however, that the various embodiments of the present invention are not limited to the precise arrangements and instrumentalities shown in the drawings.

DETAILED DESCRIPTION

A honeycomb structure having high levels of recoverable energy absorption is described herein. The honeycomb structure achieves high levels of recoverable energy absorption by incorporating cells that exhibit negative stiffness. The term "negative stiffness" is used herein to describe a structure that deforms under load such that the force required to increase the displacement of the structure decreases for a portion of the structure's deformation. On the other hand, a structure that does not exhibit negative stiffness would instead require continuously increasing force in order to continuously increase the displacement of the deforming structure.

An example of each type of structure is provided for additional clarity. For example, suppose a single cell requires 1 N of force to deform the cell by 1 mm, 2 N of force to deform the cell an additional 1 mm (to 2 mm total), and 1 N of force to deform the cell by an additional 1 mm (to 3 mm total). In this example, the cell exhibits negative stiffness because the force required to continue deforming the cell decreased (from 2 N to 1 N) after the cell was deformed 2 mm. Taking another example, suppose a single cell requires 1 N of force to deform the cell by 1 mm, 2 N of force to deform the cell an additional 1 mm (to 2 mm total), and 3 N of force to deform the cell by an additional 1 mm (to 3 mm total). In this example, the cell does not exhibit negative stiffness, instead requiring increasing force in order to increase displacement or deformation.

Figure 1:
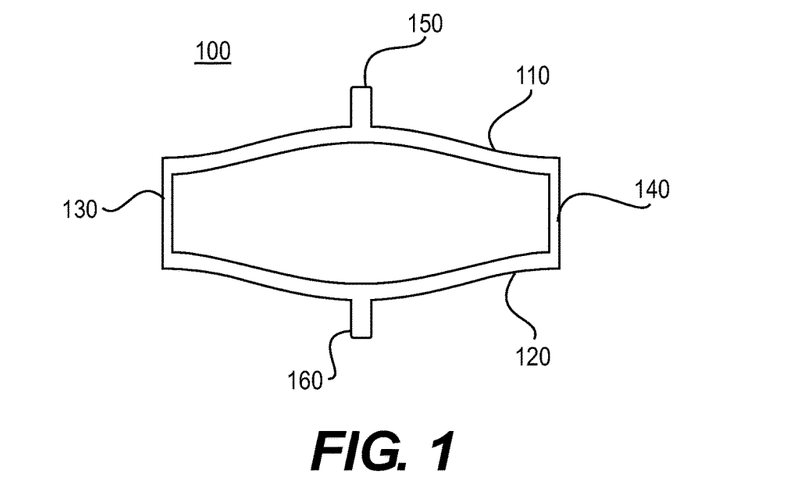
FIG. 1 is an example embodiment of a single cell capable of exhibiting a negative stiffness profile.

Applicant has devised a cellular structure containing unit cells that exhibit negative stiffness. FIG. 1 illustrates an example embodiment of one such unit cell. FIG. 1 illustrates unit cell 100. Unit cell 100 comprises a first curved beam member 110, a second curved beam member 120, and sidewalls 130 and 140. FIG. 1 also shows a portion of sidewalls 150 and 160, which connect to curved beam members 110 and 120, respectively, in a neighboring cell and which may form the sidewalls for other unit cells of, for example, a honeycomb structure.

In the example embodiment of FIG. 1, curved beam members 110 and 120 are each capable of exhibiting a negative stiffness profile under load. For example, if a force were applied through sidewall 150, in a direction through the center of unit cell 100, curved beam members 110 and 120 would begin to deform. If the force is increased beyond a sufficient threshold value, one or both of curved beam members 110 and 120 may "snap through" such that the curvature of each member is reversed. For example, while curved beam members 110 and 120 are oriented in a convex manner initially, each member may snap through to positions where the members are oriented in a concave manner. The snap-through action itself provides a negative stiffness profile.

It is not necessary for both of curved beam members 110 and 120 to snap through simultaneously. In some situations, one of the curved beam members may snap through before the other. In that example, each snap-through event provides negative stiffness. The geometry of unit cell 100 may be tailored such that one curved beam member snaps through before the other, or likewise may be tailored such that they both snap through at the same time. While curved beam members 110 and 120 are shown having similar dimensions, their dimensions need not be identical.

In addition, unit cell 100 may be designed such that only one orientation of the curved beam members 110 and 120 is considered "stable." Generally, the orientation of a structure is considered stable when the structure is able to retain that orientation in the absence of any external force. For example, the orientation of unit cell 100 shown in FIG. 1 is considered its only stable orientation. Therefore, if unit cell 100 experiences a load sufficient to snap through both curved beam members 110 and 120, and the load is then removed, unit cell 100 will return to its original form by having curved beam members 110 and 120 snap back to their original positions. In this way, unit cell 100 is able to provide recoverable energy absorption.

Figure 2:
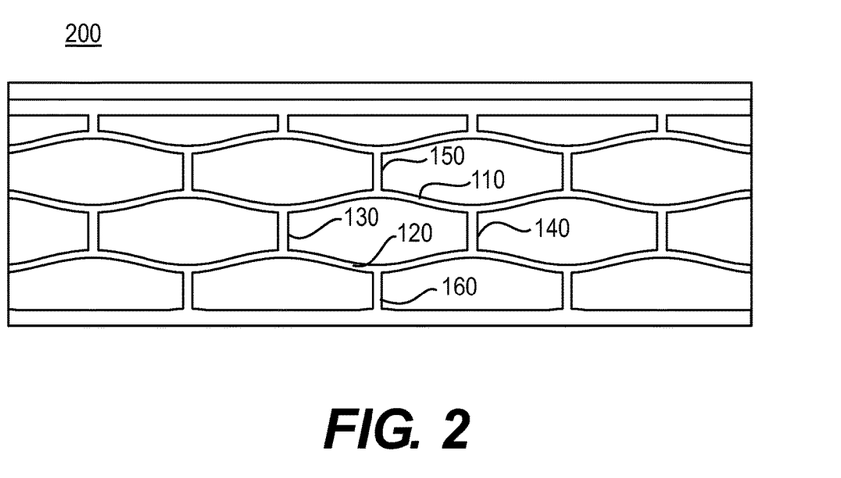
FIG. 2 is an example embodiment of a honeycomb structure comprising periodically repeating cells.

In an example embodiment, unit cell 100 may be designed such that periodically repeating unit cells may be integrated into a honeycomb structure. An example of such a structure is shown in FIG. 2. FIG. 2 shows a honeycomb structure 200 with periodically repeating unit cells. Each unit cell in honeycomb structure 200 has similar geometric features as unit cell 100 of FIG. 1. For example, each complete unit cell comprises a first curved beam member 110, a second curved beam member 120, and sidewalls 130 and 140. FIG. 2 also shows sidewalls 150 and 160, which connect to curved beam members 110 and 120, respectively, and which form the sidewalls for other unit cells. FIG. 2 also depicts top and bottom retaining walls which define respective boundaries of the honeycomb structure. Although the figure shows two rows of complete unit cells, any number of rows may be used.

In most cases increasing the number of rows or columns of unit cells corresponds to greater energy absorption capabilities. This is due to the dispersion of force between a greater number of cells. As a result, the force threshold required to cause the curved beam members to snap through would increase as the number of columns of cells dispersing the force increases, and the total displacement or travel of the structure would increase as the number of rows of deforming cells increases. In addition, the curved beam members of different unit cells may snap through at different force thresholds.

Figure 3:
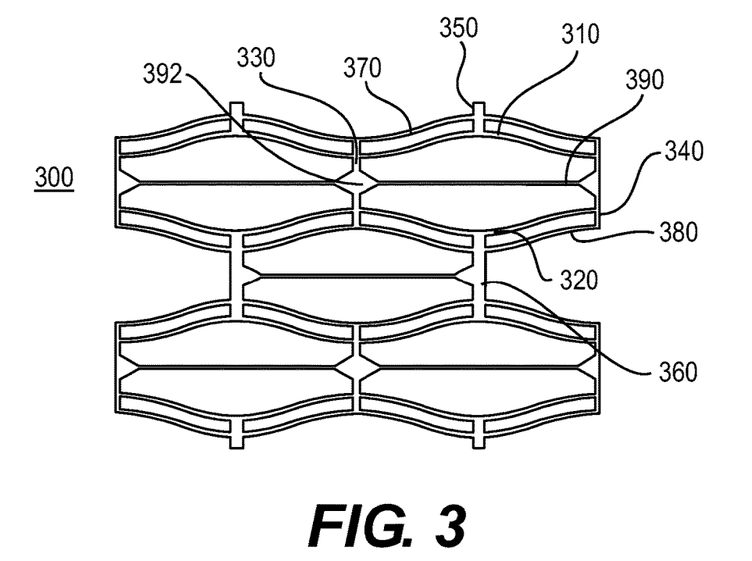
FIG. 3 is an example embodiment of a cluster of cells having a negative stiffness profile.

FIG. 3 shows another example embodiment of cluster 300 of unit cells. In this embodiment, each unit cell comprises additional cell walls compared to the embodiment of, for example, FIG. 1. The basic structure is similar. For example, a unit cell of cluster 300 comprises a first curved beam member 310, a second curved beam member 320, and sidewalls 330 and 340. FIG. 3 also shows sidewall 360, which belongs to a separate unit cell, as well as a portion of sidewall 350, each of which are connected to curved beam members 320 and 310, respectively. FIG. 3 also shows a first reinforcing cell wall 370 and a second reinforcing cell wall 380. The reinforcing cell walls 370 and 380 are shaped similarly to, for example, the curved beam members 310 and 320. Due to the similar geometry, cell walls 370 and 380 exhibit snap-through behavior, and therefore negative stiffness, in the same manner discussed above with respect to the curved beam members.

Sidewalls 350 and 360 may be disposed such that they each attach to both a curved beam member and a reinforcing cell wall. For example, sidewall 350 may be attached to curved beam member 310 as well as reinforcing cell wall 370, such that curved beam member 310 and reinforcing cell wall 370 move together as one unit. In that embodiment, curved beam member 310 and reinforcing cell wall 370 may experience snap-through behavior simultaneously. The same holds true for curved beam member 320 and reinforcing cell wall 380, which may be connected to one another via sidewall 360.

The example embodiment depicted by FIG. 3 also includes lateral constraint beam 390, which extends between sidewall 330 and sidewall 340. Lateral constraint beam 390 may be used to limit the lateral movement of unit cells in cluster 300. Without lateral constraint beam 390, a unit cell may exhibit excessive horizontal expansion upon application of vertical loading, such that the curved beam members and reinforcing cell walls spread out horizontally rather than engaging in the snap-through-like behavior that is necessary for negative stiffness. Therefore, with lateral constraint beams 390, cluster 300 will remain stable regardless of the direction of the loading force and will still exhibit negative stiffness attributes in those circumstances. Lateral constraint beam 390 may also include lateral constraint beam supports 392. These supports strengthen the bond between lateral constraint beam 390 and sidewalls 330 and 340. The strengthened support provides additional stability during loading events, both in normal and non-normal directions.

Figure 4:
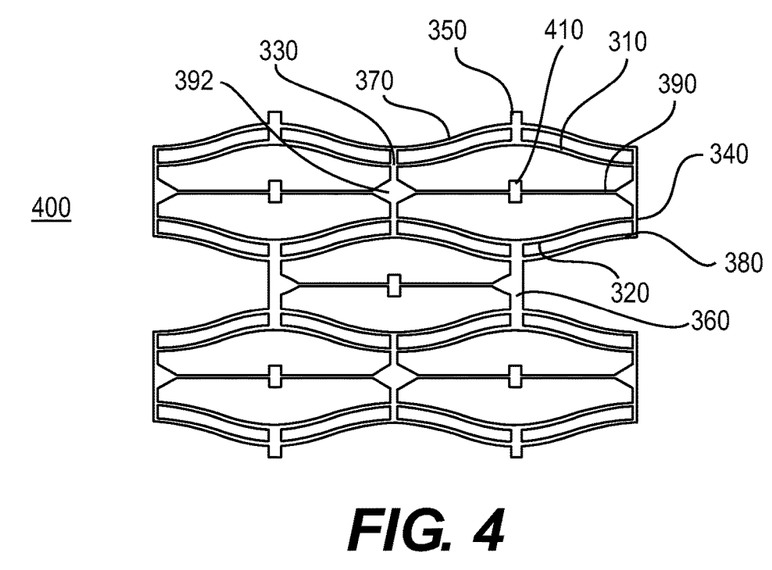
FIG. 4 is an example embodiment of a cluster of cells having a negative stiffness profile and incorporating spacers.

In an additional embodiment, spacers or shunts may be incorporated into each unit cell in order to limit the amount of compression that each cell is allowed to undergo. For example, FIG. 4 shows an example embodiment similar to the embodiment of FIG. 3 but with the addition of spacers 410. Spacers 410 may be disposed in different locations, but in FIG. 4 they are shown attached at the mid-point of lateral constraint beam 390. Spacers 410 limit the amount of compression that a unit cell is able to undergo. For example, a sufficient load acting upon cluster 400 of cells may cause, for example, snap-through behavior from curved beam member 310 and its accompanying reinforcing cell wall 370, as well as curved beam member 320 and its accompanying reinforcing cell wall 380. After those elements snap through, they may contact spacer 410. The contact would prevent any further compression of the curved beams in that unit cell. One benefit of limiting a unit cell's compression is that the cell would be less likely to plastically deform and therefore retain its full ability to recover its original shape after the load has been removed. Therefore, a cluster of cells such as cluster 400 would be able to repeatedly dissipate energy and fully recover after each loading event.

Figure 5:
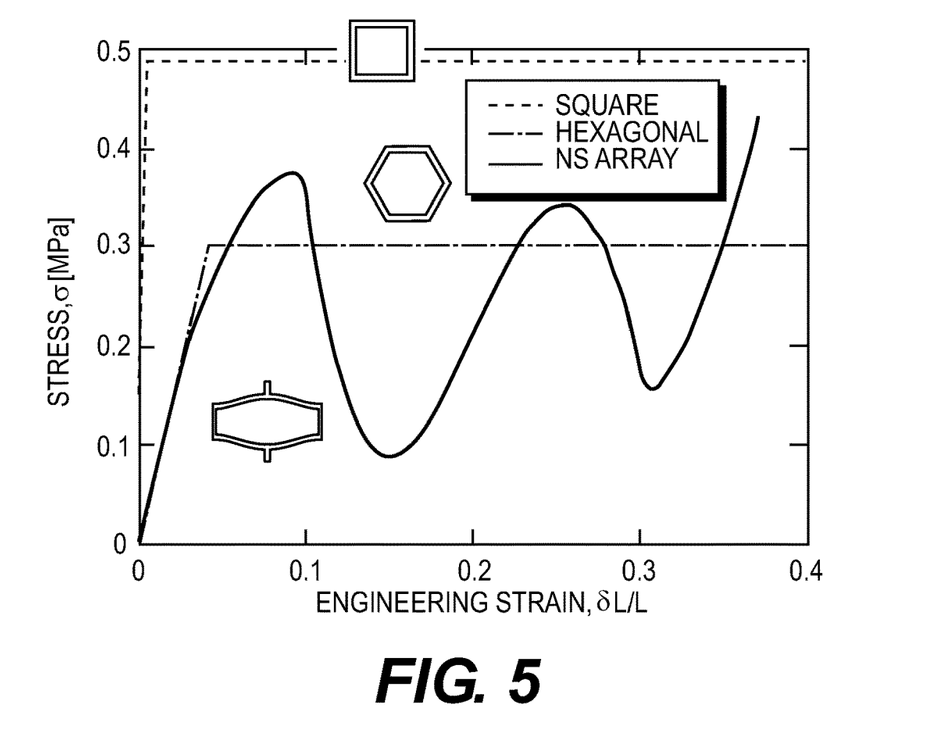
FIG. 5 is a graph showing the relationship between stress and strain for three different types of cells.

FIG. 5 shows a graphical representation of engineering strain versus stress for three different types of cellular structures with equivalent relative densities: an array of square cells, an array of hexagonal cells, and an array of cells similar to unit cell 100 of FIG. 1. As the graph shows, an array of square cells exhibits a high level of stress with only a small amount of strain. After the stress plateau has been reached, the array of square cells would begin to buckle. However, the effective elastic stiffness of the curved beam cellular structure is nearly identical to that of the hexagonal cellular structure. The force or stress threshold at which buckling occurs is very similar in the two designs, as well. The primary difference is that the hexagonal cellular structure transitions from elastic deformation to plastic buckling, whereas the curved beam cellular structure transitions to the snap-through, negative-stiffness regime which subjects the cell walls to elastic buckling and extension/compression. Therefore, the curved beam cellular structure absorbs energy in a recoverable way, such that it can reset to its original configuration when the load is removed, in preparation for a subsequent loading event. The hexagonal cellular structure, in contrast, undergoes permanent cell buckling, collapse, and densification.

Figure 6:
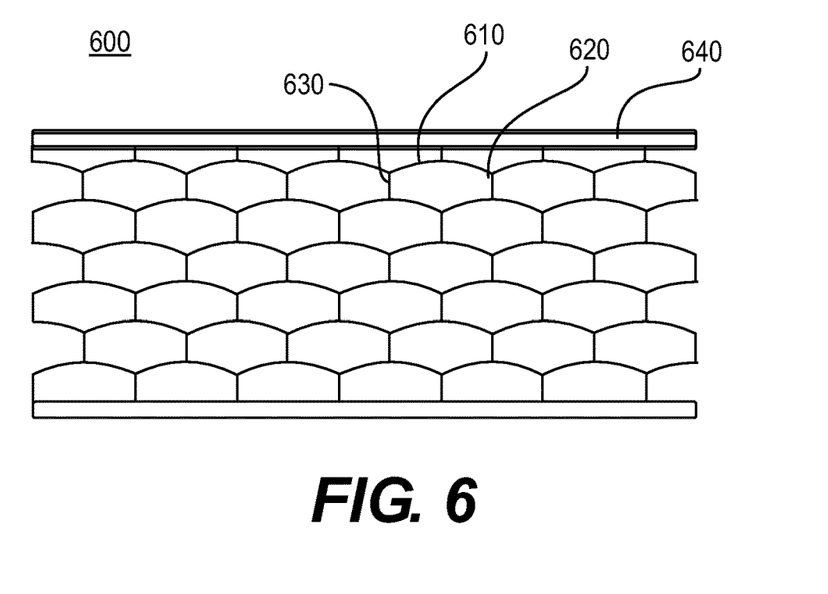
FIG. 6 is an example embodiment of a cluster of cells where each cell has only one curved beam.

FIG. 6 discloses an alternative embodiment of a cellular structure 600. As opposed to the design shown in, for example, FIG. 1, each complete unit cell of cellular structure 600 has only one curved beam member 610. Each unit cell also includes sidewalls 620 and 630. The cell is enclosed by two curved beam members of nearby cells. Cellular structure 600 also includes external support 640. External support 640 is attached to the top row of unit cells and provides a flat external surface for cellular structure 600. This type of design may be useful in many ways, including inserting cellular structure 600 into an impact absorbing device having a particular form factor.

Figure 7:
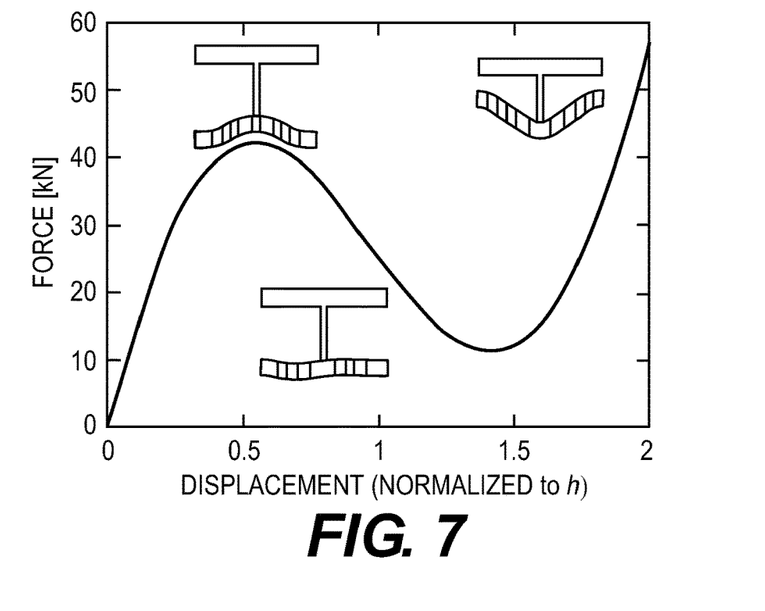
FIG. 7 is a graph showing the relationship between displacement and force for an isolated curved beam.
Figure 8:
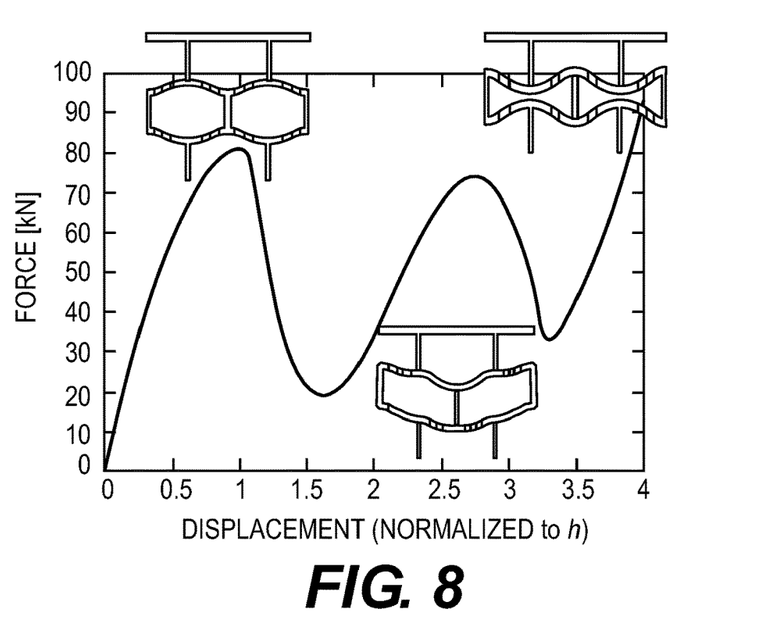
FIG. 8. is a graph showing the relationship between displacement and force for a pair of cells.

FIGS. 7 and 8 show graphs of force versus displacement for two different designs. FIG. 7 relates to the displacement of a single curved beam member under load. The graph shows an initial rise in force as displacement is increased, followed by a drop in force as the curved beam member snaps through. The snap-through period, from about 0.5 to 1.5, corresponds to negative stiffness as the required force drops. After snap through is completed, the force required to increase displacement sharply rises again.

FIG. 8 is a similar graph to FIG. 7, but shows force versus displacement for two unit cells, each of which contains two curved beam members. In this graph, a steep initial rise in force is seen. At least some of the curved beam members snap through from about 1 to 1.5 on the graph, causing the required force to sharply decline. After this period of negative stiffness is passed, continued displacement of the cells requires an increasing amount of force from about 1.7 to about 2.8. After that point, both curved beam members in both cells snap through and the pair of cells enters into another negative stiffness period from about 2.8 to about 3.3. At that point, all of the curved beam members have snapped through and increasing displacement then requires increasing amounts of force.

FIGS. 7 and 8 are merely examples and are intended to show the effects of curved beam members snapping through to provide negative stiffness. In practice, cellular structures incorporating the designs discussed herein may take a variety of forms and may produce graphs with varying amounts and magnitudes of negative stiffness conditions. The precise design may depend on the intended use of the cellular structure. The figures shown are therefore merely examples and are not intended to limit the claims in any way.

The cellular structure described above may be used in a wide variety of applications. Generally speaking, the disclosed cellular structure may be used in any application related to impact absorption or dissipation. For example, the structure may be incorporated into the design of a motor vehicle. Automobiles are required to pass specific impact tests, such as front-end collisions. As a result, it may be useful to incorporate the disclosed cellular structure into, for example, the bumper of a car. For lightweight or low-cost vehicles, it may even be possible to incorporate the disclosed cellular structure into the suspension of the vehicle. The interior of a vehicle may also make use of the cellular structure in order to better protect passengers.

Other potential uses of the cellular structure include personal protection devices. In this context, personal protection devices may encompass, for example, sporting goods, body armor, and footwear, to name only a few. Regarding sporting goods, the cellular structure may be incorporated into, for example, helmets, shoulder pads, baseball gloves, and other devices intended to dissipate impacts experienced in particular sports. With respect to body armor, the cellular structure may be incorporated into the body armor in a manner that would assist in dissipating forces experienced by, for example, law enforcement officers. Regarding footwear, the cellular structure may be incorporated into the sole of a running shoe, for example, in order to lessen the impact a runner experiences from striking the ground with each stride. A wide variety of other uses are possible, and the disclosure herein is not intended to limit these uses in any way.

Example

Figure 9A:
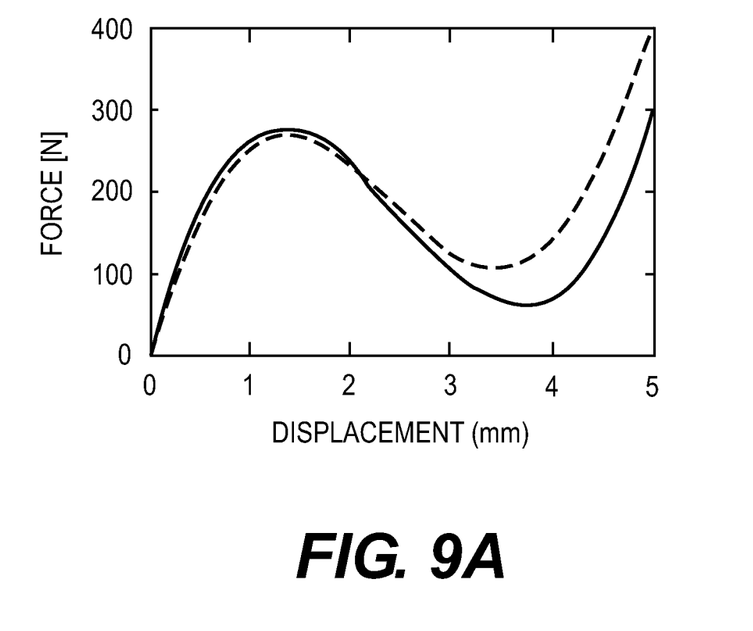
FIG. 9A is a graph comparing an analytical prediction and a finite element analysis for force and displacement.
Figure 9B:
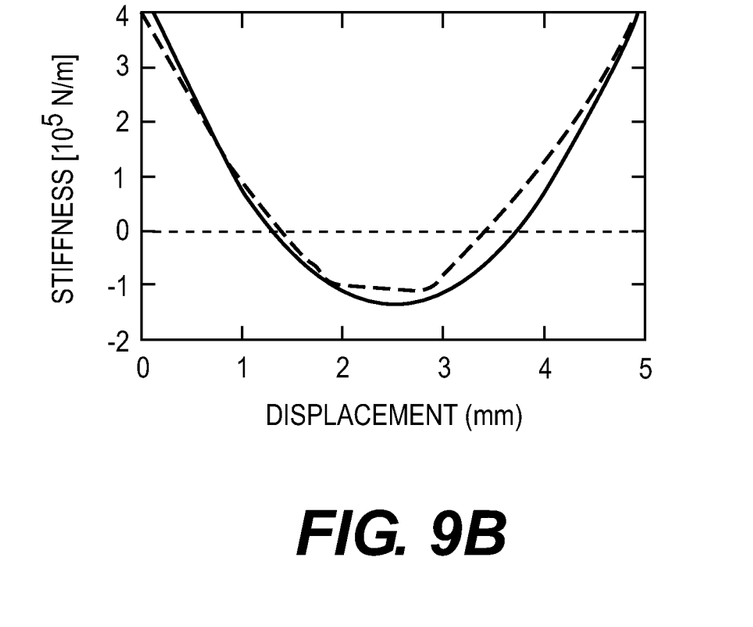
FIG. 9B is a graph comparing an analytical prediction and a finite element analysis for stiffness and displacement.

Finite element analysis ("FEA") was performed on a unit cell to validate the curved-beam approach for obtaining negative stiffness. The FEA results are compared with the analytical prediction in FIGS. 9A and 9B. The results indicate strong agreement between the FEA and analytical predictions. Both the force- and stiffness-displacement responses are very similar between the analytical prediction and the FEA. The FEA considers a beam with elastic boundary conditions, whereas the analytical expression considers beams with fixed ends only. This difference is likely to be the primary source of discrepancy between the analytical and FEA model results.

Figure 10:
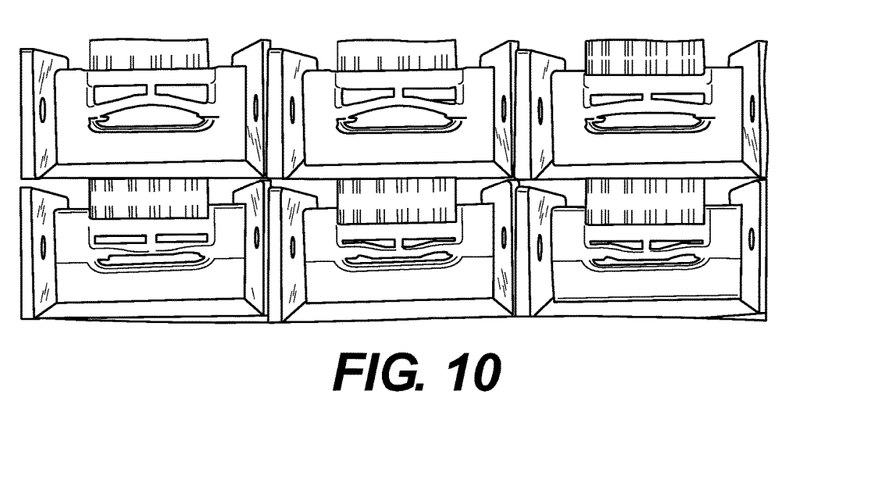
FIG. 10 shows a sample curved beam unit cell undergoing deformation during force-displacement testing.

The unit cell was fabricated on an SLS HiQ Sinterstation Machine using Nylon 11 powder. The resulting manufactured unit cell is shown in FIG. 10. The force-displacement behavior of the unit cell was tested using an MTS Sintech 2/G test frame equipped with a 10,000 N load cell. As shown in FIG. 10, a range of displacements was applied to the top of the T-shaped interface and the reaction force as a function of displacement was monitored by the load cell. This particular test stand is equipped with a bearing-mounted bottom platform which allows for self-righting of the platform. An aluminum block was fabricated to sit atop the T-shaped interface of the unit cell to ensure flatness with respect to the load cell. Finally, the negative stiffness element was mounted in a steel vise, which provided a zero-displacement boundary condition, when desired, at the edges of the negative stiffness element.

Figure 11A:
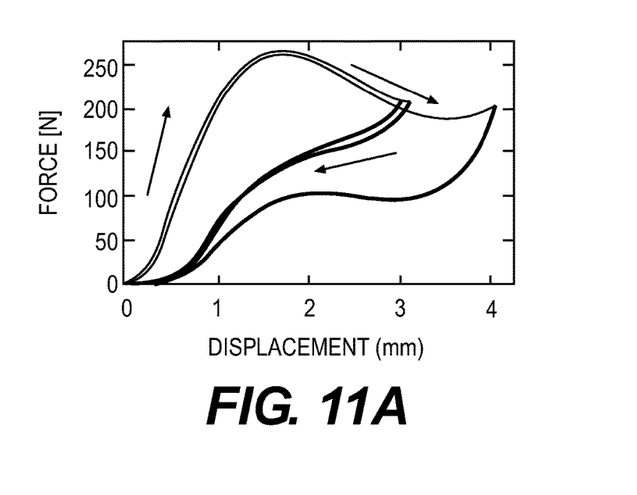
FIG. 11A is a graph of an experimental force-displacement curve for a curved beam unit cell with a zero-displacement boundary condition on the vertical side walls.
Figure 11B:
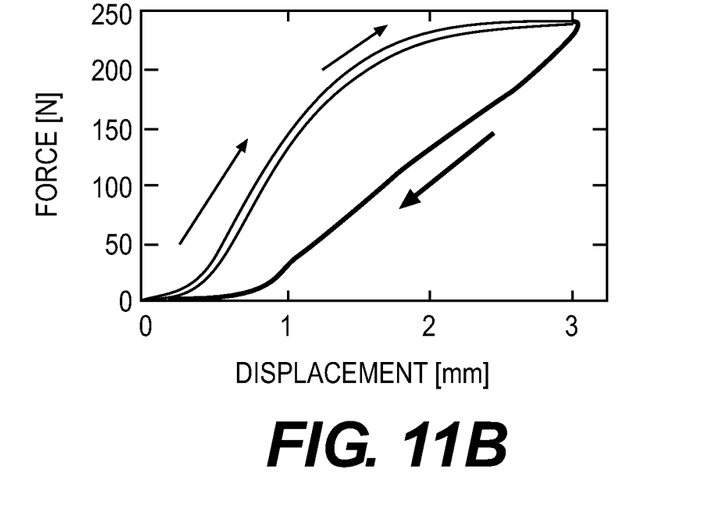
FIG. 11B is a graph of an experimental force-displacement curve for a curved beam unit cell with a free-displacement boundary condition on the vertical side walls.

FIG. 10 shows example deformations of the unit cell during testing with a constrained boundary condition applied to the edges. The large and nonlinear displacements of the beam element are evident as the displacement applied at the top of the element is increased. Force-displacement plots for zero-displacement and free-boundary conditions are shown in FIGS. 11A and 11B, respectively. The black data points and arrows indicate the loading path (displacement applied downwards), and the blue data points and arrows indicate the unloading path. FIG. 11A shows that with a constrained boundary condition, the large element exhibits negative stiffness over a range of displacements of approximately 1.75 to 3.5 mm. Furthermore, FIG. 11A shows that the force-displacement relationship is highly repeatable (at least in the case of loading), even for different displacement amounts. FIG. 11A shows that the unit has a different force-displacement relationship depending on the direction of loading. When the unit cell is unloaded after having been compressed, the results do not follow the loading curve. Furthermore, FIG. 11A shows that for different displacements, the force-displacement relation differs on the unloading path. This is most likely due to internal material losses, which have been investigated experimentally in previous work with Nylon 11 SLS components.

FIG. 11B depicts the effect of easing the constraints on the edges of the unit cell. With the boundary constraint free, the unit cell no longer demonstrates negative stiffness. This is a result of the increased flexibility of the unit cell frame at its boundaries leading to the elimination of the negative stiffness effect. The lateral constraint beam 390 prevents this free expansion in the embodiment in FIG. 3. Similar to FIG. 11A, FIG. 11B also demonstrates repeatable test results as well as different paths for loading and unloading.

Figure 12A:
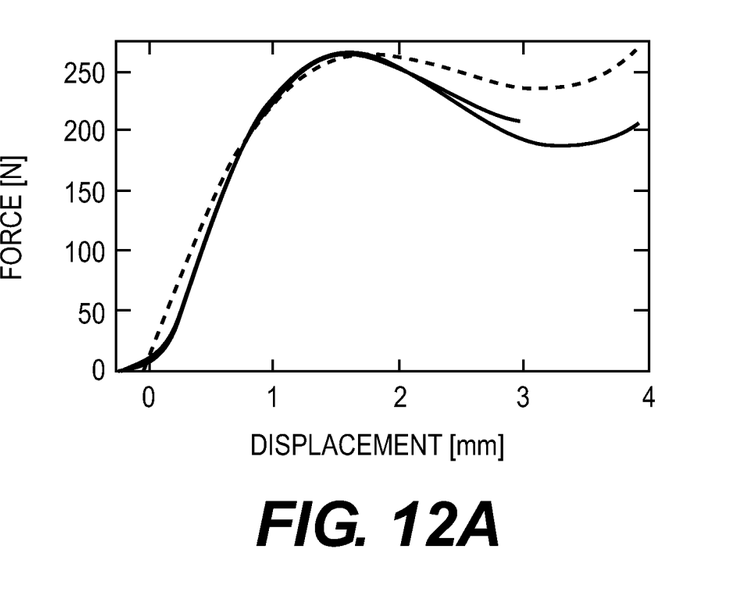
FIG. 12A is a graph comparing experimental and finite element analysis force-displacement curves for a zero-displacement boundary condition on the vertical side walls.
Figure 12B:
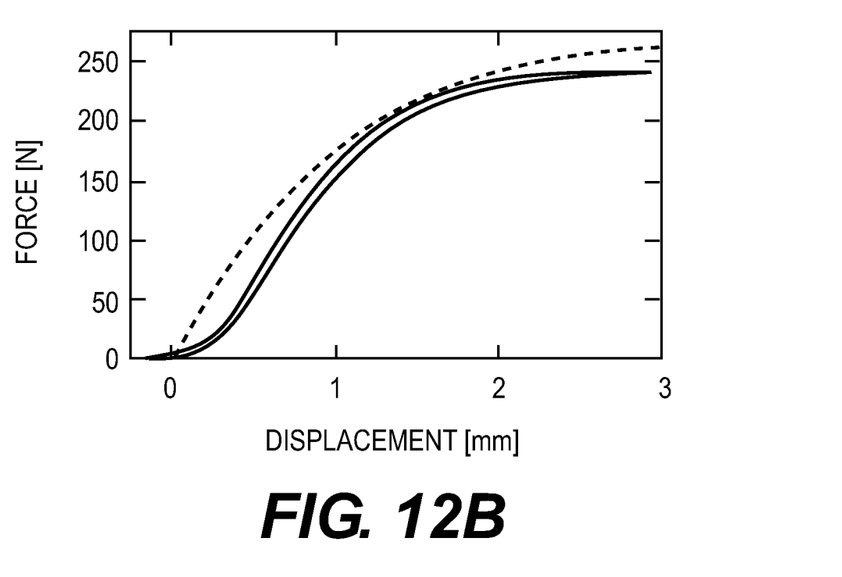
FIG. 12B is a graph comparing experimental and finite element analysis force-displacement curves for a free-displacement boundary condition on the vertical side walls.

FEA and experimental force-displacement curves are compared in FIGS. 12A and 12B, with the FEA results shown represented by solid lines and experiment with dashed lines. Only the loading path is compared, because the FEA model did not incorporate material losses to model the full-cycle response. Although not an exact match, the FEA results reflect distinct similarities with the test data. Negative stiffness behavior is observed with zero-displacement boundary conditions for FEA and experimental conditions, and it occurs over a similar range of displacements at a similar force threshold. Also, the loading path is similar for FEA and experimental conditions with free boundary conditions. Discrepancies between experimental and FEA data are most likely caused by imprecision in the manufacturing process. A few spot-check measurements of the as-built dimensions of the prototype unit cells revealed differences from the as-designed dimensions. For example, while the curved beam was designed with a constant thickness, the as-built elements demonstrated a non-constant thickness, whose effects on force-displacement behavior are difficult to quantify.

While specific embodiments have been described in detail in the foregoing detailed description and illustrated in the accompanying drawings, it will be appreciated by those skilled in the art that various modifications and alternatives to those details could be developed in light of the overall teachings of the disclosure and the broad inventive concepts thereof. It is understood, therefore, that the scope of the present disclosure is not limited to the particular examples and implementations disclosed herein, but is intended to cover modifications within the spirit and scope thereof as defined by the appended claims and any and all equivalents thereof.

What is claimed is:

1. An energy absorbing cellular structure, comprising:
   a plurality of cells,
   wherein at least one of said plurality of cells comprises:
      a first sidewall;
      a second sidewall spaced apart and opposite the first sidewall;
      a first cell wall extending between and coupled to the first and second sidewalls;
      a second cell wall spaced apart and opposite the first cell wall, the second cell wall extending between and coupled to the first and second sidewalls;
      a first reinforcing cell wall extending between and coupled to the first and second sidewalls, the first reinforcing cell wall being parallel and spaced apart from the first cell wall;
      a second reinforcing cell wall extending between and coupled to the first and second sidewalls, the second reinforcing cell wall being parallel and spaced apart from the second cell wall;
      a lateral constraint beam extending between and coupled to the first and second sidewalls and being disposed between and spaced apart from the first and second cell walls, the lateral constraint beam preventing lateral movement of the first and second sidewalls relative to each other; and
      a spacer disposed at a mid-point of the lateral constraint beam and extending from the lateral constraint beam in a direction toward the first and second cell walls, the spacer having distal ends adjacent and spaced apart from the first and second cell walls, wherein the spacer prevents the first cell wall, the second cell wall, the first reinforcing cell wall, and the second reinforcing cell wall from deflecting beyond a predetermined amount;
   wherein:
      the first cell wall is disposed between and spaced apart from the first reinforcing cell wall and the lateral constraint beam,
      the second cell wall is disposed between and spaced apart from the second reinforcing cell wall and the lateral constraint beam,
      the first cell wall, the first reinforcing cell wall, the second cell wall, and the second reinforcing cell wall each comprise a curved beam that has only one stable orientation that deflects under a load and returns to an original state of the curved beam after the load is removed, and
      each of the curved beams of the first cell wall, the first reinforcing cell wall, the second cell wall, and the second reinforcing cell wall exhibits a negative stiffness load profile when the load is applied to the cellular structure.

2. The cellular structure of claim 1, wherein the plurality of cells are periodically repeating.

3. A method of elastically absorbing energy, comprising:
   providing a cellular mesostructure, the cellular mesostructure having a plurality of cells, each cell comprising:
      a first sidewall;
      a second sidewall spaced apart and opposite the first sidewall;
      a first cell wall extending between and coupled to the first and second sidewalls;
      a second cell wall spaced apart and opposite the first cell wall, the second cell wall extending between and coupled to the first and second sidewalls;

a first reinforcing cell wall extending between and coupled to the first and second sidewalls, the first reinforcing cell wall being parallel and spaced apart from the first cell wall;

a second reinforcing cell wall extending between and coupled to the first and second sidewalls, the second reinforcing cell wall being parallel and spaced apart from the second cell wall;

a lateral constraint beam extending between and coupled to the first and second sidewalls and being disposed between and spaced apart from the first and second cell walls, the lateral constraint beam preventing lateral movement of the first and second sidewalls relative to each other; and a spacer disposed at a mid-point of the lateral constraint beam and extending from the lateral constraint beam in a direction toward the first and second cell walls, the spacer having distal ends adjacent and spaced apart from the first and second cell walls, wherein the spacer prevents the first cell wall, the second cell wall, the first reinforcing cell wall, and the second reinforcing cell wall from deflecting beyond a predetermined amount;

wherein:
the first cell wall is disposed between and spaced apart from the first reinforcing cell wall and the lateral constraint beam, the second cell wall is disposed between and spaced apart from the second reinforcing cell wall and the lateral constraint beam, the first cell wall, the first reinforcing cell wall, the second cell wall, and the second reinforcing cell wall each comprise a curved beam that has only one stable orientation that deflects under a load and returns to an original state of the curved beam after the load is removed, and each of the curved beams of the first cell wall, the first reinforcing cell wall, the second cell wall, and the second reinforcing cell wall exhibits a negative stiffness load profile when the load is applied to the cellular structure; and applying the load with a predetermined amount of force, the predetermined amount of force causing the curved beams of the first cell wall, the first reinforcing cell wall, the second cell wall, and the second reinforcing cell wall to deflect, wherein the curved beams of the first cell wall, the first reinforcing cell wall, the second cell wall, and the second reinforcing cell wall recover their original configuration upon removal of the predetermined amount of force.

4. The method of claim 3, further comprising placing the cellular mesostructure within an impact absorbing device.

5. The method of claim 4, wherein the impact absorbing device is a component of a motor vehicle.

6. The method of claim 4, wherein the impact absorbing device is a personal protection apparatus.

7. The method of claim 4, wherein the impact absorbing device is an apparatus for use in sports.

8. The cellular structure of claim 1, wherein the lateral constraint beam comprises a first lateral constraint beam support and a second lateral constraint beam support, wherein the first lateral constraint beam support extends between the lateral constraint beam and the first sidewall, and the second lateral constraint beam support extends between the lateral constraint beam and the second sidewall, the first and second lateral constraint beam supports strengthening a bond between the lateral support beam and the sidewalls during loading events in both normal and non-normal directions.

9. The method of claim 3, wherein the lateral constraint beam comprises a first lateral constraint beam support and a second lateral constraint beam support, wherein the first lateral constraint beam support extends between the lateral constraint beam and the first sidewall, and the second lateral constraint beam support extends between the lateral constraint beam and the second sidewall, the first and second lateral constraint beam supports strengthening a bond between the lateral support beam and the sidewalls during loading events in both normal and non-normal directions.

* * * * *